United States Patent [19]

Kato et al.

[11] Patent Number: 4,627,086
[45] Date of Patent: Dec. 2, 1986

[54] PLASMA X-RAY SOURCE

[75] Inventors: Yasuo Kato, Zama; Yoshio Watanabe, Tokyo; Seiichi Murayama, Kokubunji, all of Japan

[73] Assignee: Hitachi, Ltd., Tokyo, Japan

[21] Appl. No.: 772,692

[22] Filed: Sep. 5, 1985

[30] Foreign Application Priority Data

Sep. 7, 1984 [JP] Japan .................. 59-186538
Sep. 21, 1984 [JP] Japan .................. 59-196624

[51] Int. Cl.$^4$ .................. G21B 1/00; H01J 35/00
[52] U.S. Cl. .................. 378/119; 378/34
[58] Field of Search .................. 378/119, 121, 34; 376/145; 315/111.11

[56] References Cited

U.S. PATENT DOCUMENTS 3,746,860 7/1973 Shatas et al. .................. 378/119
4,152,625 5/1979 Conrad .................. 315/111.7
4,355,262 10/1982 Chan et al. .................. 315/111.11

Primary Examiner—Craig E. Church
Assistant Examiner—T. N. Grigsby
Attorney, Agent, or Firm—Antonelli, Terry & Wands

[57] ABSTRACT

A plasma X-ray source is operable, like the plasma focus type source, to generate impulse discharge through a gas filled in a discharge tube. A relatively small amount of the gas is continuously supplied to and evacuated from the discharge tube in accordance with an occurrence frequency of discharge, without operating evacuation and filling of the gas at each cycle of discharge, under the regulation to make constant the pressure within the discharge tube, thereby eliminating the time for exchange of gas contaminated by discharge, reducing the amount of gas used, and improving reproducibility of discharge.

3 Claims, 2 Drawing Figures

PLASMA X-RAY SOURCE

BACKGROUND OF THE INVENTION

This invention relates to a plasma X-ray source which creates a plasma of high temperature and high density by using impulse discharge to generate soft X-rays, and more particularly to an improvement in an X-ray source suitable for, for example, an X-ray aligner adapted to manufacture sub-micron integrated circuits.

Among various existing types of plasma X-ray sources, a plasma X-ray source such as a plasma focus type or a gas puff and pinch type source utilizing a discharge of a gas at a lower pressure than atmospheric pressure is especially suited for the X-ray source for X-ray aligner because it has high X-ray generation efficiency and the lifetime of its electrodes is long.

In a plasma focus type source which has been studied and reported in detail by J. W. Mather in Methods of Experimental Physics, Vol. 9, PtB, page 189 (1971, Academic Press), two coaxial cylindrical electrodes, which are, at one end, electrically insulated from each other by means of a glass tube and are opened at the other end, are disposed inside a discharge chamber which is filled with a gas, the gas is ionized by applying across the electrodes an impulse voltage produced from a charged capacitor to create an initial plasma, and the initial plasma is moved in a space between the electrodes to form an ultimate plasma of high temperature and high density which is focused on the tip of one electrode serving as a target and which is used for generation of neutrons and soft X-rays from the ultimate plasma.

The plasma focus type source is advantageous in that its construction and operation can be simplified for generation of strong soft X-rays but suffers from problems that reproducibility is poor for each cycle of discharge and repetition of discharge is slow. These problems are inherent to such a discharge tube as the plasma focus type source based on filling of a working gas and subsequent generation of dicharge. Especially, the problem of poor reproducibility is due to the fact that under discharging, atoms of impurity gases absorbed in the electrodes are emitted into the discharge space with the result that the working gas is mixed with the impurity gases and contaminated thereby, causing the pressure in the discharge tube to charge. It follows therefore that the discharge condition is so changed as to impair the reproducibility. To prevent this problem, there needs a series of operations of evacuating the working gas after completion of each cycle of discharge and re-filling the working gas at a predetermined pressure. For evacuation and re-filling of the working gas, a commensurate time is consumed which determines a period for each cycle of repetitions discharge. The throughput of wafers is of significance in the X-ray aligner and the time consuming plasma focus type source is unsatisfactory for use with the X-ray aligner. In addition, because of the series of evacuation and re-filling operations, surface conditions of the insulating members and the electrodes accommodated in the discharge tube change to a great extent, giving rise to possible impairment of the stationary operation. Further, the discharge tube has an unused space which does not participate in light emitting or discharging. The entire working gas inclusive of even a portion thereof prevailing in the unused space is exchanged and therefore the amount of gas used is increased inevitably.

SUMMARY OF THE INVENTION

An object of this invention is to provide a plasma X-ray source operable, like the plasma focus type source, under the application of a gas filled in a discharge tube and which can improve producibility by reducing the time for evacuation and filling of the gas relative to the discharge tube, can improve reproducibility by reducing variations in X-ray intensity at each cycle of discharge, and can increase intensity of X-rays by reducing absorption of X-rays.

To accomplish the above object, according to the invention, there is provided a plasma X-ray source operable, like the plasma focus type source, to generate impulse discharge through a gas filled in a discharge tube, wherein a relatively small amount of the gas is continuously supplied to and evacuated from the discharge tube in accordance with an occurrence frequency of discharge, without operating evacuation and filling of the gas at each cycle of discharge, so that pressure within the discharge tube can be regulated to be constant, thereby eliminating the time for exchange of a contaminated gas resulting from discharge, reducing the amount of gas used and improving reproducibility of discharge.

DESCRIPTION OF THE PREFERRED EMBODIMENTS

Figure 1:
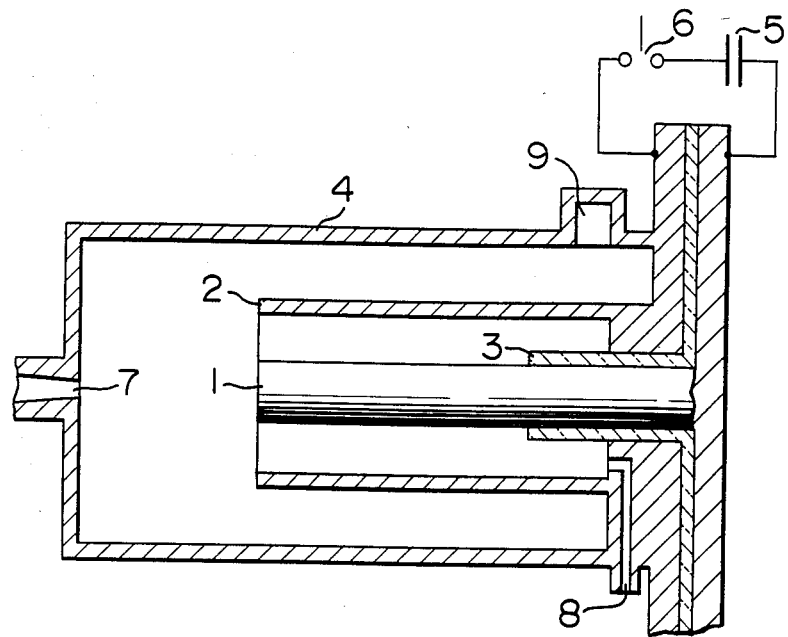
FIG. 1 is a longitudinal sectional view showing a plasma X-ray source of plasma focus type according to an embodiment of the invention.

Referring to a plasma X-ray source in the form of a plasma focus type discharge tube embodying the invention, a cylindrical anode electrode 1 is surrounded by a cylindrical cathode electrode 2 which is disposed concentrically with the cylindrical anode electrode 1. These two electrodes 1 and 2 are electrically insulated from each other at one end by means of a glass tube 3. A resulting assembly is accommodated in a discharge chamber or tube 4 in which a gas such as neon, argon, krypton or xenon is filled at a pressure of 0.1 to 1 Torr. A charged capacitor 5 is connected across the two electrodes 1 and 2 through a discharge switch 6. When the discharge switch 6 is operated, a high voltage impulse is applied across the electrodes 1 and 2 and a surface discharge first takes place along the glass tube 3, thus creating an initial plasma. This initial plasma undergoes forces due to an electric field between the electrodes 1 and 2 and a circular magnetic field around the anode electrode and consequently moves along the electrodes. As the initial plasma passes by the other open end of the electrode assembly, it is pinched by a pressure of the magnetic field to form an ultimate plasma spot of high temperature and high density which is focused on the tip of the target anode electrode 1 and which is used for generation of soft X-rays therefrom.

In this embodiment, an outlet 7 is coaxial with the tip of the electrode 1 as shown in FIG. 1, and it is in communication with an evacuating pump (not shown) so as to be evacuated continuously. A gas inlet 8 and a gas pressure sensor 9 are also provided. The flow rate of an inflow gas supplied through the inlet 8 is regulated such that internal gas pressures detected by the sensor 9 can be constant. The outlet 7 also acts as an X-ray window, and an X-ray aligner (not shown) disposed in front of the outlet 7 is also in communication therewith. With this construction, an outflow gas in an X-ray path which is exterior of the outlet 7 can always have a lower pressure than a pressure of the internal gas within the discharge chamber 4, thereby making it possible to reduce absorption of X-rays by the outflow gas. This is advantageous especially for a gas such as neon which is used for generation of X-rays having a wavelength of more than 1 nm. For example, this embodiment can prevent 22% absorption of 1.4 nm wavelength X-rays which would otherwise be caused when the X-rays propagate by 20 cm in a space filled with neon at 1 Torr. Further, since the internal gas fucused on the axis of the tip of the anode electrode can be evacuated efficiently, the discharge space between the electrodes 1 and 2 can be cleaned by jetting the inflow gas into the discharge space. When the outlet 7 is 5 cm distant from the tip of the anode electrode 1, it is so dimentioned as to have a diameter of 2.5 mm and a length of 2 cm. The thus dimensioned outlet 7 has a conductance of about 0.1 l/sec with which the inflow gas is required to have a flow rate of about 0.1 Torr·l/sec in order to maintain a pressure of 1 Torr within the discharge chamber 4. If the gas is exchanged after completion of each 10-second cycle of discharge according to the conventional method, then the inflow gas flow rate will be 0.5 Torr·l/sec for a discharge chamber having a total volume of 5 l, indicating that the present embodiment can reduce the amount of gas used by 1/5.

A more remarkable effect obtained by this embodiment accounts for improved reproducibility. Specifically, while a discharge responsible for weak X-ray intensity is observed at a probability of about 50% according to the convertional method, the probability can be greatly reduced to less than 20% according to the present embodiment.

Figure 2:
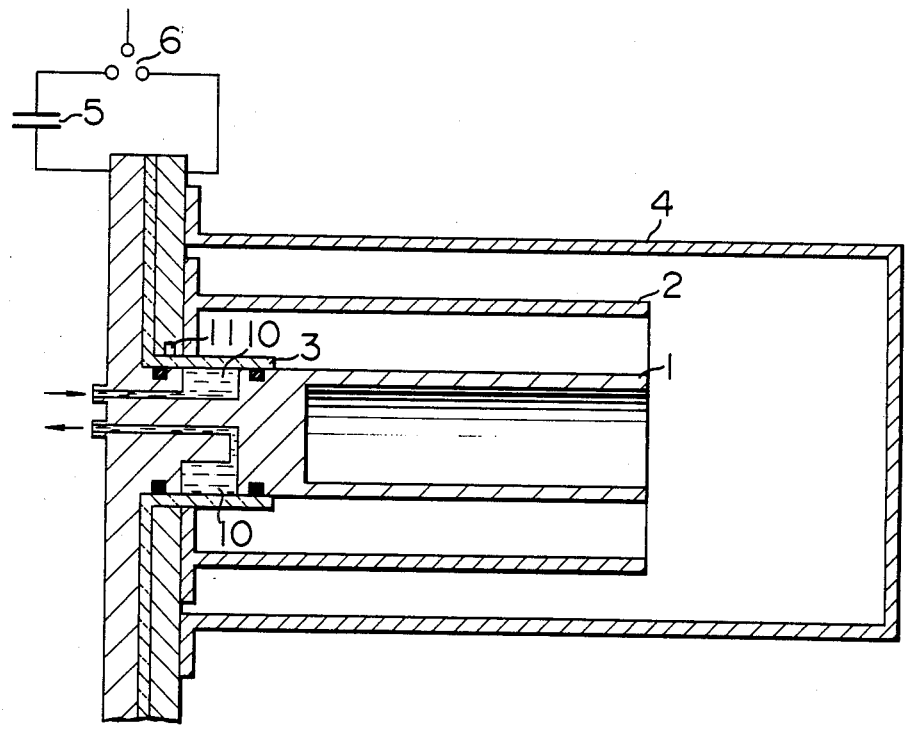
FIG. 2 is a longitudinal sectional view showing another embodiment of the invention.

Referring to FIG. 2, another embodiment of the invention will be described. In FIG. 2, elements characteristic to the second embodiment are particularly illustrated with elimination of illustration of the outlet 7, inlet 8 and sensor 9 common to the FIG. 1 embodiment.

In the construction of FIG. 2, an initial plasma is first created by a surface discharge along the glass tube 3 and becomes a nucleus for successive ionization of atoms present in a space between the electrodes 1 and 2 so that, under the influence of the electric and magnatic fields, an ultimate plasma is created which is focused on the tip of the anode electrode. If the initial plasma has an uneven density distribution or the amount of a transient plasma varies, the subsequent movement of discharge will vary and the ultimate plasma to be focused will deviate from the axis of the anode electrode or will change in temperature and density, causing intensity of X-rays generated from the target to fluctuate. After studying the X-ray intensity fluctuation, the inventor of the present invention has found that the X-ray intensity fluctuation can effectively be reduced by making constant the amount of gas absorbed to the surface of the glass tube 3. Accordingly, in this embodiment, it is intended to stabilize the X-ray output by controlling temperatures of the glass tube 3 so as to make uniform the discharge time intervals. As shown in FIG. 2, the temperature stabilization of the glass tube 3 is exemplarily implemented by providing a fluid conduit 10 near the glass tube 3 and circulating through the fluid conduit 10 a liquid or gas medium at a constant temperature or a liquid medium of a suitable boiling point in order to control temperatures of the glass tube 3. To further promote the stabilization, a temperature sensor such as a thermistor is embedded in a hole 11 for temperature measurement and the temperatures of the glass tube 3 measured by the thermistor are used to control the flow rate of the liquid or gas medium circulating through the fluid conduit 10. Pure water, air, fleon gas or liquid nitrogen may be used as the circulating liquid or gas medium.

Thus, the second embodiment ensures that in the plasma X-ray source of the plasma focus type creating the initial plasma by the surface discharge along the glass tube, the discharge time intervals can be made uniform by stabilizing the temperatures of the glass tube so as to further promote reduction in the intensity fluctuation of X-rays radiated from the ultimate plasma.

As described above, according to the invention, in the plasma X-ray source operable, like the plasma focus type source, to generate inpulse discharge through a gas filled in a discharge tube, the discharge is effected by continuously supplying and evacuating a relatively small amount of the gas to and from the discharge tube under the regulation to make constant the pressure within the discharge tube, without operating conventional evacuation and filling of the gas at each cycle of discharge, thereby eliminating the time for exchange of gas, reducing the period of discharge, improving reproducibility of discharge, reducing attenuation of X-rays in the X-ray path, and reducing the amount of gas used.

We claim:

1. A plasma X-ray source comprising:
   a cylindrical anode electrode;
   a cathode electrode spaced apart from said anode electrode and disposed concentrically with said anode electrode to surround it;
   insulating means interposed between said anode electrode and said cathode electrode to electrically insulate said anode electrode from said cathode electrode;
   a discharge chamber housing said anode and cathode electrodes to define a discharge space;
   means for applying an impulse voltage across said anode and cathode electrodes so as to create a plasma within said discharge space; and
   means for maintaining the pressure in said discharge space to be constant by regulating continuous supply and evacuation of a discharge working gas to and from said discharge space.

2. A plasma X-ray source according to claim 1 wherein said pressure maintaining means comprises an outlet provided to said discharge chamber in coaxial relationship with the tip of said anode electrode, an inlet provided at a bottom portion of said discharge chamber, and a pressure sensor provided interiorly of said discharge chamber.

3. A plasma X-ray source according to claim 1 wherein said insulating means comprises means for stabilizing temperatures of said insulating means.

* * * * *